United States Patent
Campbell et al.

(10) Patent No.: US 10,138,606 B2
(45) Date of Patent: Nov. 27, 2018

(54) EXPANSION JOINT COMPRISING A HYBRID POLYUREA-POLYURETHANE HEADER COMPOSITION

(71) Applicant: Construction Research & Technology GmbH, Trostberg (DE)

(72) Inventors: Dale Campbell, Savage, MN (US); Gary Moore, Orchard Park, NY (US); Frank V. Apicella, Jr., Hiram, OH (US); Konrad Wernthaler, Charlotte, NC (US)

(73) Assignee: Construction Research & Technology GmbH, Trostberg (DE)

( * ) Notice: Subject to any disclaimer, the term of this patent is extended or adjusted under 35 U.S.C. 154(b) by 691 days.

(21) Appl. No.: 14/348,095

(22) PCT Filed: Dec. 6, 2012

(86) PCT No.: PCT/EP2012/074644
§ 371 (c)(1),
(2) Date: Mar. 28, 2014

(87) PCT Pub. No.: WO2013/083694
PCT Pub. Date: Jun. 13, 2013

(65) Prior Publication Data
US 2014/0241787 A1    Aug. 28, 2014

Related U.S. Application Data

(60) Provisional application No. 61/567,250, filed on Dec. 6, 2011.

(51) Int. Cl.
*E04B 1/68*    (2006.01)
*E01C 11/10*    (2006.01)
(Continued)

(52) U.S. Cl.
CPC ............ *E01C 11/103* (2013.01); *C08G 18/42* (2013.01); *C08G 18/4288* (2013.01);
(Continued)

(58) Field of Classification Search
CPC ........ E04B 1/68; E04B 1/6801; E04B 1/6803; E04B 1/6807; E04B 1/6812; E01C 11/10; E01C 11/103; E01C 11/106; E01D 19/06
See application file for complete search history.

(56) References Cited

U.S. PATENT DOCUMENTS 5,007,765 A * 4/1991 Dietlein .................. E01C 11/10
404/66
5,190,395 A * 3/1993 Cathey .................... E01D 19/06
404/48

(Continued)

FOREIGN PATENT DOCUMENTS

AU    645 940 B1    1/1994
CA    2767184 A1 *    1/2011    ............ E01C 11/106
(Continued)

OTHER PUBLICATIONS

International Preliminary Report on Patentability for International Application No. PCT/EP2012/074644, dated Jun. 10, 2014.
(Continued)

*Primary Examiner* — Jonathan P Masinick
(74) *Attorney, Agent, or Firm* — Curatolo Sidoti Co., LPA; Salvatore A. Sidoti; Peter J. Beardsley

(57) ABSTRACT

Provided is a header composition for an expansion joint system. The header composition includes a hybrid polyurea-polyurethane composition and is designed to have a short cure time at low temperatures. Also provided are an expansion joint system incorporating the hybrid polyurea-polyurethane header composition and a method for applying the header composition into the expansion joint system.

20 Claims, 7 Drawing Sheets

(51) Int. Cl.
*C08G 18/76* (2006.01)
*C08G 18/42* (2006.01)
*C08L 75/04* (2006.01)
*C08L 75/12* (2006.01)

(52) U.S. Cl.
CPC .............. *C08G 18/76* (2013.01); *C08L 75/04* (2013.01); *C08L 75/12* (2013.01); *E01C 11/10* (2013.01); *E04B 1/6801* (2013.01); *E04B 1/681* (2013.01); *E04B 1/6807* (2013.01); *E04B 1/6812* (2013.01); *E04B 1/6813* (2013.01); *C08G 2190/00* (2013.01); *Y10T 403/21* (2015.01)

(56) References Cited

U.S. PATENT DOCUMENTS

| | | | | |
|---|---|---|---|---|
| 5,197,250 A | * | 3/1993 | Kramer | E01D 19/06 404/65 |
| 5,297,372 A | | 3/1994 | Nicholas | |
| 5,649,784 A | * | 7/1997 | Ricaud | E01D 19/067 14/73.1 |
| 6,682,260 B2 | * | 1/2004 | Peltz | E01C 11/103 404/17 |
| 2010/0307102 A1 | | 12/2010 | Barnett et al. | |

FOREIGN PATENT DOCUMENTS

| | | |
|---|---|---|
| FR | 1 462 479 A | 4/1966 |
| JP | 2010 132733 A | 6/2010 |
| WO | WO 2011/008285 A2 | 1/2011 |

OTHER PUBLICATIONS

Canadian Office Action for corresponding Canadian Application, 2,856,955, dated Sep. 9, 2015.
Australian Office Action for corresponding Australian Application, 2012347270, dated Sep. 30, 2015.
PCT/EP2012/074644—International Search Report, dated May 28, 2013.
PCT/EP2012/074644—Written Opinion of the International Searching Authority, dated May 28, 2013.

* cited by examiner

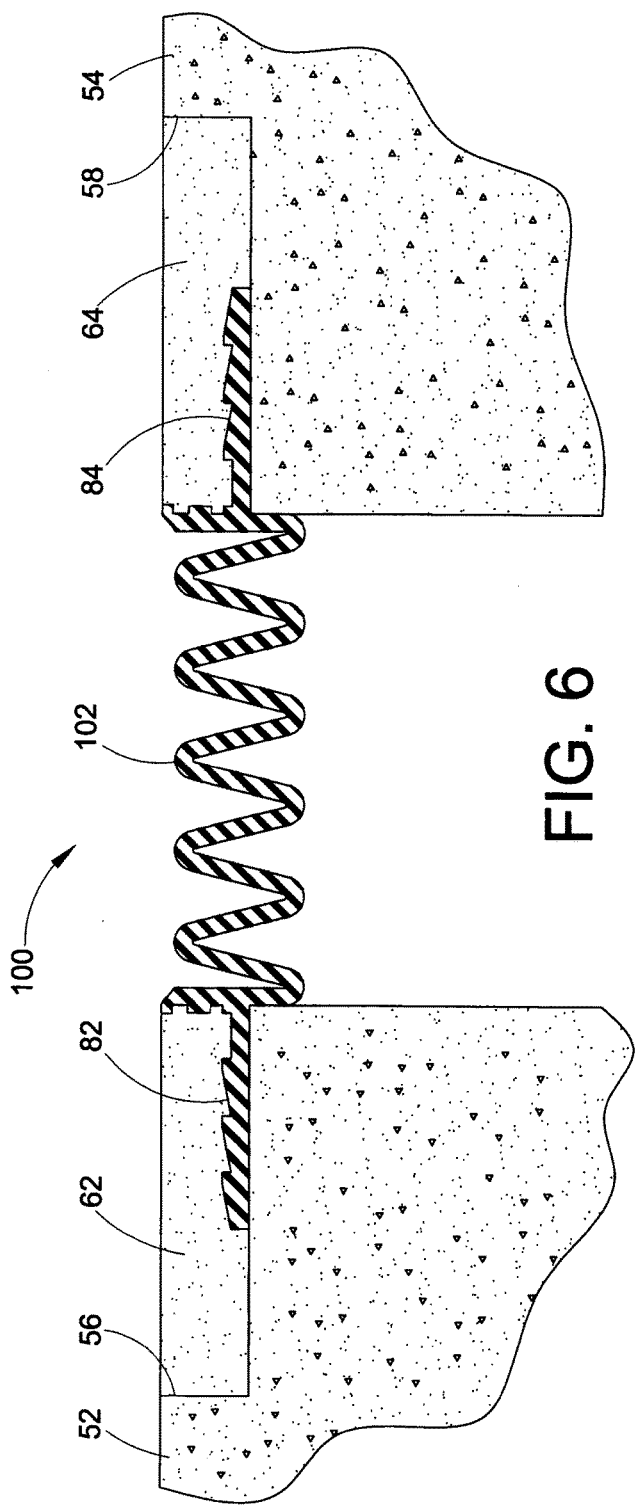
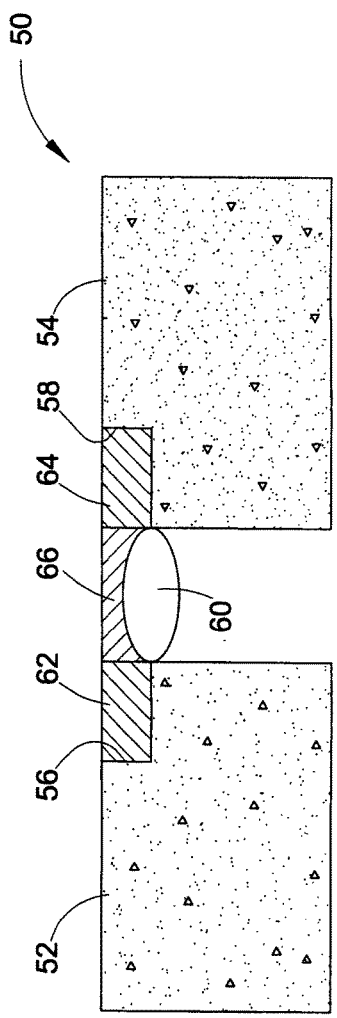
FIG. 6
FIG. 7

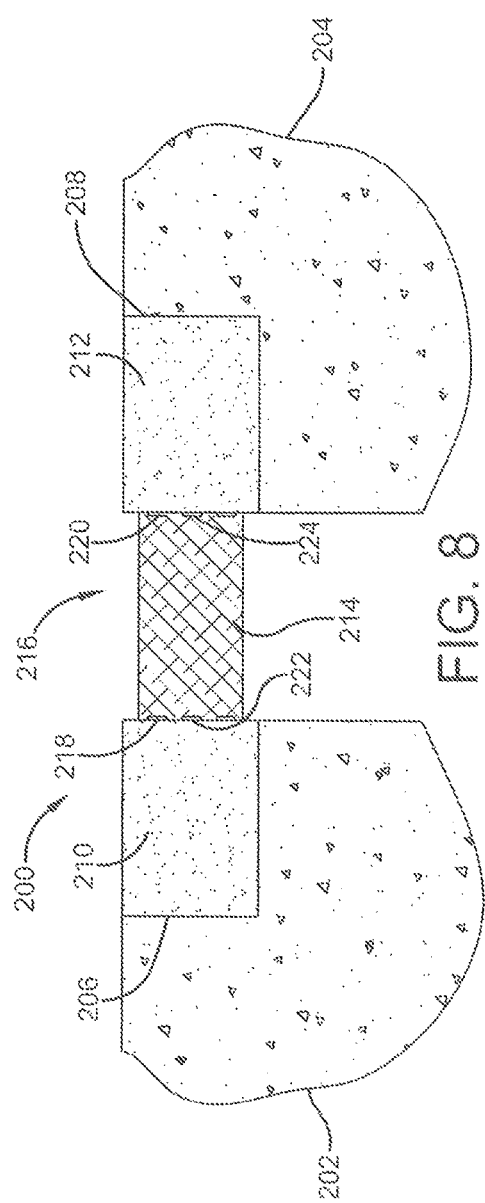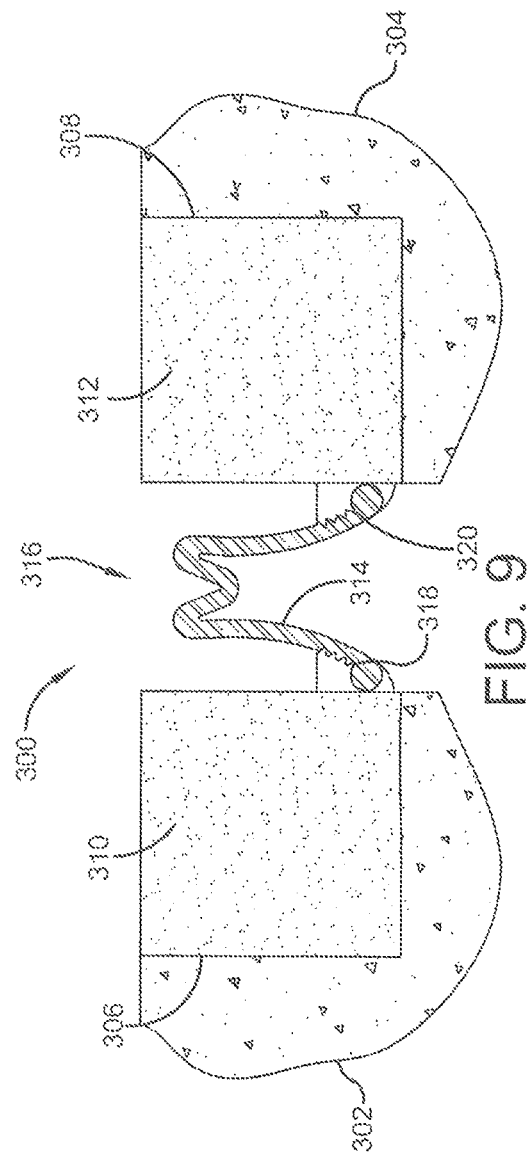

EXPANSION JOINT COMPRISING A HYBRID POLYUREA-POLYURETHANE HEADER COMPOSITION

CROSS REFERENCE TO RELATED APPLICATIONS

This application is a national stage application of International Application No. PCT/EP2012/074644, filed 6 Dec. 2012, which claims priority from U.S. Provisional Application Ser. No. 61/567,250, filed 6 Dec. 2011, from which applications priority is claimed, and both of which are incorporated herein by reference.

TECHNICAL FIELD

Provided is a header material for an expansion joint system. The header material provides a transition from an expansion joint gap to an adjacent structure and is capable of being used in various types of infrastructure.

BACKGROUND

During infrastructure construction, a gap is intentionally provided between adjacent structural members for accommodating dimensional changes within the infrastructure. Such dimensional changes occur as a result of expansion and contraction of the structural members due to conditions including, but not limited to, temperature changes, shortening caused by pre- and/or post-stressing of the concrete sections, creep, seismic disturbances, as well as deflections and longitudinal forces caused by vehicular traffic.

An expansion joint system is typically utilized to accommodate such gaps within infrastructure construction including movements in the vicinity of such gaps. An expansion joint is typically formed by sealing the gap between adjoining structural members with an expansion joint and applying a mass of structural material (a.k.a., a header material) to each side of the joint opening. Expansion joint systems are capable of accommodating dimensional changes to the gap occurring with the expansion and contraction of the structural members due to factors listed above.

Expansion joint systems, particularly in heavily trafficked bridge structures, sports stadiums, parking garages and airports are degraded when the header material must bear the wear and tear caused by contact with vehicle wheels. The expansion joint material can be compromised from the gap between the structures when the adhesion between the concrete material and the expansion material degrades allowing the ingress of water and development of damaging affects.

In addition, header compositions typically have a short working time (also referred to as pot life) before cure. At higher temperatures, the working time is even shorter as higher temperatures generally result in shorter working times. This poses a problem because such header compositions do not provide for an adequate amount of time for the header material to be applied properly within an expansion joint system.

Therefore, a need exists in the art for an improved expansion joint system and header material which is capable of resisting degradation by providing improved performance and which provides for an adequate amount of time to be applied before cure.

SUMMARY

Provided is a header composition for use as a component of an expansion joint system, the header composition comprising a blend of a polyurea component and a polyurethane component.

Also provided is an expansion joint system comprising first and second adjacent structural members having a gap defined between said structural members, recesses formed in the surfaces of said first and second adjacent structural members, and a hybrid polyurea-polyurethane composition located within said the recess of at least one of said first and second adjacent structural members.

Further provided is an expansion joint system comprising first and second adjacent structural members having a gap defined between said structural members, recesses formed in the surfaces of said first and second adjacent structural members, and a header composition located within said recess of at least one of said first and second adjacent structural members, said header composition comprising a polymer and a low moisture content aggregate.

Also provided is a method of applying a header composition within an expansion joint comprising introducing a first component of said header composition from a first storage container to a mix chamber through a first conduit; introducing a second component of said header composition from a second storage container to a mix chamber through a second conduit; mixing said first and second components to initiate a reaction between said first and second components; and applying the mixture of said first and second components into a recess formed in the surface of at least one of a first and second adjacent structural members.

According to certain illustrative embodiments, the method of applying a header composition within an expansion joint system for an infrastructure construction comprises introducing at least one isocyanate from a first storage container to a mix chamber through a first conduit, introducing at least one polyol and an amine from a second storage container to the mix head through a second conduit, mixing the isocyanate, the polyol and the amine in the mix head to form a hybrid polurea-polyurethane header composition and applying the hybrid polurea-polyurethane header composition into recesses formed in adjacent structural members. The hybrid polurea-polyurethane header composition may be applied through a movable mixer output.

According to further illustrative embodiments, the method of applying a header composition within an expansion joint comprises introducing a first component of said header composition from a first storage container to a mix chamber through a first conduit; introducing a second component of said header composition from a second storage container to a mix chamber through a second conduit; mixing said first and second components to initiate a reaction between said first and second components; positioning a third conduit having a plurality of apertures within a recess formed in the surface of at least one adjacent first and second structural members; and applying the mixture of said first and second components into said recess formed in the surface of at least of said first and second adjacent structural members.

According to certain illustrative embodiments, the method of applying a header composition within an expansion joint system comprises introducing at least one isocyanate from a first storage container to a mix chamber through a first conduit; introducing at least one polyol and an amine from a second storage container to the mix chamber through a second conduit; mixing the isocyanate, the polyol and the amine in the mix chamber to form a hybrid polyurea-polyurethane header material; and applying the hybrid polyurea-polyurethane header material to the expansion joint through a third conduit having a plurality of apertures, wherein the third conduit is positioned within a recess formed in the surface of at least one of first and second structural members.

BRIEF DESCRIPTION OF THE DRAWINGS

FIG. 6 is a schematic of an illustrative embodiment of an expansion joint system containing a header material.

FIG. 7 is a schematic of an illustrative embodiment of an expansion joint system containing a header material.

FIG. 8 is a schematic of an illustrative embodiment of an expansion joint system containing a header material.

FIG. 9 is a schematic of an illustrative embodiment of an expansion joint system containing a header material.

DETAILED DESCRIPTION

Figure 1:
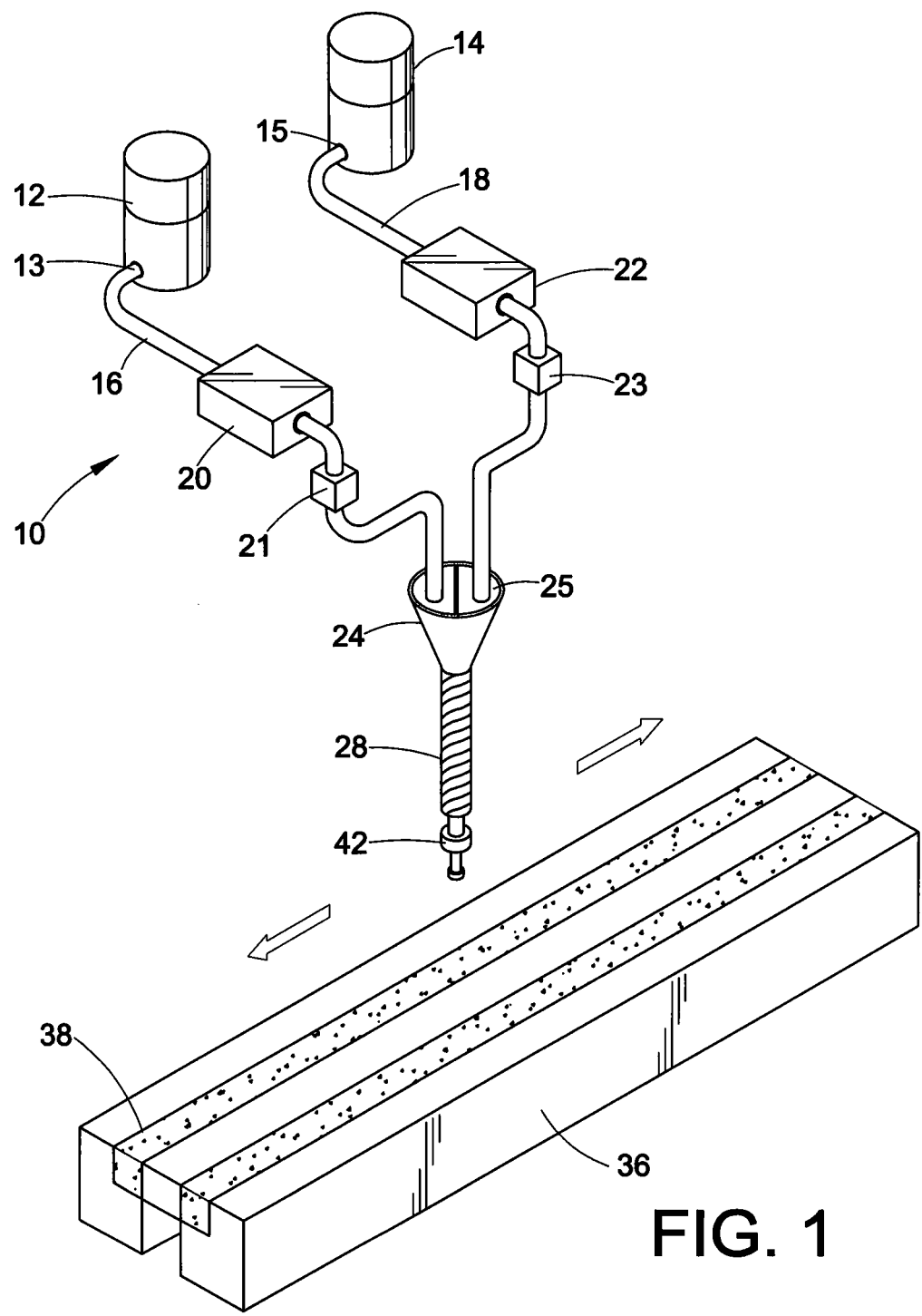
FIG. 1 is a schematic of an illustrative embodiment of a device used to apply the header material within an expansion joint for infrastructure construction.

Provided is a header material that is a component of an expansion joint system used between two adjacent, spaced-apart sections of an infrastructure construction. Non-limiting examples of infrastructure construction which the expansion joint system and header material may be utilized include bridges, roadways, waterways, piers, railways, airport runways, parking decks and other similar appendages. These structures are typically installed in sections to allow for adequate space to set, to minimize cracking which may result from the thermal expansion and contraction of the concrete and to accommodate the various stresses that are typically placed on the structure.

The header material comprises a hybrid polyurea-polyurethane header composition. The header material may serve as a structural component of the expansion joint system to provide a transition from an expansion joint gap to an adjacent structure. In certain embodiments, the header material is capable of transferring vehicular wheel loads to the superstructure in addition to absorbing impact load as vehicles traverse across an expansion joint.

Between each construction section is a gap defined between adjacent first and second structural members. Each of the first and second structural members has a recess formed therein. The header material may be installed in recessed areas formed in first and second structural members defining a gap therebetween. The recesses of the first and second structural members oppose each other and abut the gap formed between the first and second structural members. In certain embodiments, the expansion joint is sealed by providing a stop-gap (e.g., a backing rod) in between the gap formed between the adjacent first and second roadway sections and applying a sealant over the stop-gap to close the gap between the adjacent first and second roadway sections.

In other embodiments, the expansion joint is sealed by anchoring a strip seal or a glandular seal between the adjacent first and second roadway sections. A header material is applied within the recessed portions of the adjacent first and second roadway sections. The seal and the header material close the gap between the adjacent first and second roadway sections and provide a smooth road surface or base which also functions as a cushion and an energy absorber for passing traffic.

The header composition used in the expansion joint system may also include low moisture content aggregates which are used as a form of reinforcement to the header composition. By "low moisture content" it is meant that the aggregate has a moisture content which does not contribute to foaming of the hybrid polyurea-polyurethane header composition which may lower the overall compressive strength of the set header composition. In certain embodiments, the low moisture content aggregate has a moisture content of about 0.2% or less. In other embodiments, the low moisture content aggregate has a moisture content of less than 0.05%. In other embodiments, the aggregate has a moisture content of less than 0.02%. In other embodiments, the low moisture content aggregate has a moisture content of less than 0.01%. Without being bound to any particular theory, it is believed that the low moisture content of the aggregate allows for superior bonding upon application of the header material to the aggregate and allow the header material to achieve the final strengths (i.e., compressive strength) required for expansion joint systems after cure.

Without being bound to any particular theory, it is believed that the aggregate may also function like a heat sink during the polymeric reaction which takes place during formation of the header material. In general, the polymeric reaction is an exothermic reaction, wherein the heat produced during the chemical reaction may function as a catalyst to further speed up the reaction process. The low moisture content aggregate may counteract this effect by absorbing the heat produced during the formation of the header material and slowing down the overall reaction process to allow sufficient time for application of the header material. In addition, without being bound to any particular theory, it is believed that the aggregate has the effect of minimizing shrinkage. Material without aggregate exotherms and in so doing, expands. Once the material cools, it shrinks back to a smaller size. It is believed that aggregates minimize this tendency.

According to certain embodiments, any header material may be used in combination with the low moisture content aggregate, including the hybrid polyurea-polyurethane header composition. In certain embodiments, about 50% to about 60% of the recesses are filled with the low moisture content aggregate and about 40% to about 50% of the recesses is filled with a header material. The low moisture content aggregate may be first placed within the recesses of the adjacent roadway sections before the header material is installed into the recesses. The header material flows around the low moisture content aggregate and is allowed to cure. In other embodiments, the header material is first added to the recesses before the aggregate is added. The aggregate is then added to the header material and allowed to sink within the header material.

The header material is a high performance hybrid header material comprising a blend or mixture of a polyurea component and a polyurethane component. The hybrid polyurea-polyurethane header material is formed by the reaction of at least one isocyanate, at least one polyol and at least one amine.

Any known isocyanate may be utilized to form the hybrid polyurea-polyurethane header composition. The isocyanate may include at least one of aromatic isocyanates, aliphatic isocyanates, cycloaliphatic isocyanates, araliphatic isocyanates or mixtures thereof. The isocyanate component typically is a diisocyanate or a triisocyanate or mixtures thereof. Examples of aromatic isocyanates which may be utilized to form the polyurea-polyurethane hybrid header material include but are not limited to methylene diphenyl diisocyanates (MDI), toluene diisocyanates (TDI), polymeric methylene diphenyl diisocyanates (PMDI), p-phynyl diisocyanates (PDI), naphthalene diisocyanates (NDI), aliphatic isocyanates such as hexamethylene diisocyanates (HDI), hexamethylene diisocyanate trimers (HDI Trimers), dicyclohexylmethane diisocyanates ($H_{12}$MDI), isophorone diisocyanates (IPDI), cyclohexane diisocyanate (CHDI), tetramethylxylylene diisocyanate (TMXDI) or mixtures thereof.

In other embodiments, suitable polyisocyanates may include diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, diphenylmethane-2,4'diisocyanate, diphenylmethane 2,2'diisocyanate, m-xylene diisocyanate, m- or p-tetramethylxylene diisocyanate, 4,4'dicyclohexylmethane diisocyanate, hydrogenated xylylene diisocyanate, 1-methyl-2,4-diisocyanato-cyclohexane, tetramethoxybutane 1,4-diisocyanate, butane 1,4-diisocyanate, 1,6-diisocyanato-2,2,4-trimethylhexane, tetramethoxybutane 1,4-diisocyanate, butane 1,4-diisocyanate, 1,6-diisyanato-2,2,4-trimethylhexane, 1,6-diisocyanato-2,4,4-trimethylhexane, 1-isocyanato-1-methyl-4(3)-isocyanatomethylcyclohexane, 1,12-dodecane diisocyanate, 4,4'-biphenylene diisocyanate, 3,3'-dimethoxy-4,4'-biphenyl diisocyanate, 3,3'-dimethyl-4,4'-diisocyanate, 1-isocyanato-3,3,5-trimethyl-5-isocyanatomethylcyclohexane; triisocyanates such as 4,4', 4'-triphenylmethane tri-isocyanate; triisocyanates such as 4,4',4'-triphenylmethane tri-isocyanate, polymethylene polyphenylisocyanate and toluene, 2,4,5-triisocyanate; and tetraisocyanates, such as 4,4'-dimethyldiphenylmethane-2, 2'-5,5'-tetraisocyanate, or mixtures thereof. In certain embodiments, the isocyanate comprises a methylene diphenyl diisocyanate. More particularly, in certain embodiments, the isocyanate comprises diphenylmethane 4,4'-diisocyanate. The amount of diphenylmethane 4,4'-diisocyanate used to form the hybrid polyurea-polyurethane header composition may range from about 20 to about 55 percent by weight of the header material.

Any known polyol may be utilized to form the hybrid polyurea-polyurethane header composition. In certain embodiments, the polyol is a renewable based polyol. Suitable polyols include glassy solid/amorphous or crystalline polyhydroxy compounds and fatty acid esters. Difunctional polypropylene glycols may be mentioned as typical examples. Random copolymers and/or block copolymers of ethylene oxide and propylene oxide which have hydroxyl groups can also be used. Suitable polyetherpolyols are the polyethers known in polyurethane chemistry, such as the polyols, prepared using starter molecules from styrene oxide, propylene oxide, butylene oxide, tetrahydrofuran or epichlorohydrin.

Further suitable polyols which may be used to form the polyurea-polyurethane hybrid header material include glassy amorphous or crystalline polyesterdiols or polyesterpolyols which are liquid at 25° C. and can be prepared by condensation of di- or tricarboxylic acids, such as adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid, and/or dimeric fatty acid, with low molecular weight diols, triols or polyols, such as ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimeric fatty alcohol, glycerol, pentaerythritol and/or trimethylolpropane.

Other suitable polyols which may be used to form the polyurea-polyurethane hybrid header material include polypropylene diol, polypropylene triol, polypropylene polyol, polyethylene diol, polyethylene triol, polyethylene polyol, polybutadiene diol, polyesterdiol, polyestertriol, polyesterpolyol, polyesteretherdiol, polyesterethetriol, polyesteretherpolyol and mixtures thereof.

Further suitable polyols include polyesters, for example those based on caprolactone, which are also referred to as "polycaprolactones". Further polyols which may be used are polycarbonate polyols and dimeric diols and polyols based on vegetable oils and their derivatives, such as castor oil and the derivatives thereof or epoxidized soybean oil. Also suitable are polycarbonates which have hydroxyl groups and are obtainable by reaction of carbonic acid derivatives, e.g. diphenyl carbonate, dimethyl carbonate or phosgene, with diols. For example, ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenol A, tetrabromobisphenol A, glycerol, trimethylolpropane, 1,2,6-hexanetriol, 1,2,4-butanetriol, trimethylolpropane, pentaerythritol, quinitol, mannitol, sorbitol, methylglycoside and 1,3,4,6-dianydrohexitols are particularly suitable. Hydroxy-functional polybutadienes, which are commercially available, inter alia, under the trade name "Poly-bd®", can also be used as polyols, as can hydrogenated analogues thereof. Hydroxy-functional polysulphides, which are marketed under the trade name "Thiokol®" NPS-282" and hydroxyl-functional polysiloxanes are also suitable.

In certain embodiments, the polyol used to form the hybrid polyurea-polyurethane header composition typically comprises a fatty acid ester. The fatty acid ester may be at least one of natural fatty acid esters, synthetic fatty acid esters or mixtures thereof. Non-limiting examples of natural fatty acid esters which may be used to form the polyurea-polyurethane hybrid header material include but are not limited to canola oil, castor oil, coconut oil, cotton seed oil, flax seed oil, hemp seed oil, jojoba oil, olive oil, palm oil, peanut oil, pumpkin seed oil, safflower oil, sesame oil, soybean oil, sunflower oil, or mixtures thereof. In certain embodiments, the fatty acid ester or polyol used to form the hybrid polyurea-polyurethane header composition is castor oil. Castor oil, when cross-linked with the isocyanate, has been shown to resist water intrusion and degradation. The amount of castor oil used to form the hybrid polyurea-polyurethane header composition may range from about 65 to about 95 percent by weight of the header material.

Synthetic fatty acid esters which may be utilized to form the polyurea-polyurethane hybrid header material include but are not limited to various polyether trimers or tetra-functional resins. Suitable but non-limiting examples of synthetic fatty acid esters which may be utilized to form the polyurea-polyurethane header material include Polycin® D-290 and Polycin® D-265, commercially available from Vertellus Performance Materials (Greensboro, N.C.) and N,N,N',N'-Tetrakis(2-hydroxypropyl)ethylene-diamine, commercially sold under the trademark Quadrol (BASF Corporation, Wyandotte, Mich.). Polycin D-290 has a renewable character of greater than 80% and, in certain embodiments, may function as a modifier to replace a portion of the amine component. Polycin D-290 may also have the effect of improving the viscosity of the overall hybrid polyurea-polyurethane header composition. In certain embodiments, Polycin D-290 may improve the viscosity of the hybrid polyurea-polyurethane header composition by about 20%, allowing the header material to more easily flow through the low moisture content aggregate, where applied. In certain embodiments, the polyol may comprise a combination of castor oil and Polycin D-290. In certain embodiments, the amount of Polycin D-290 used in combination with castor oil is about 10% by weight of the total amount of polyol used to form the hybrid polyurea-polyurethane header material.

Any amine may be utilized to form the hybrid polyurea-polyurethane header composition. In certain embodiments, a combination of more than one amine may be used to form the hybrid polyurea-polyurethane header composition. The amine may be at least one of a monofunctional amine, a difunctional amine, a trifunctional amine, a tetrafunctional amine, polyamines or mixtures thereof.

Non-limiting examples of polyamines which may be used to form the polyurea-polyurethane hybrid header material, include but are not limited to, hydrazine, hydrazine hydrate and substituted hydrazines, such as N-methylhydrazine, N,N'-dimethylhydrazine, acid hydrazides of adipic acid, methyl adipic acid, sebacic acid, hydracrylic acid, terephthalic acid, semicarbazidoalkylenehydrazides, such as 13-semicarbazidopropionic acid hydrazide, semicarbazidoalkylene carbazine esters, such as, for example 2-semicarbazidoethyl carbazine ester, and/or aminosemicarbazide compounds, such as 13-aminoethylsemicarbazidocarbonate and mixtures thereof.

Other suitable examples of amines which may be used to form the polyurea-polyurethane hybrid header material include polypropylene diamine, polypropylenetriamine, polypropylenepolyamine, poly-THF-diamine and mixtures thereof.

In certain embodiments, the amine comprises two difunctional amines and a trifunctional amine. In certain embodiments, at least one of the difunctional amines is an aromatic amine. Suitable examples of aromatic difunctional amines which may be utilized to form the hybrid polyurea-polyurethane header composition include but are not limited to N,N'-bis(2-propyl)polyoxypropylene diamine, commercially sold under the trademarks Jeffamine® SD, Jeffamine® SD-231 and Jeffamine® SD 2001 (Huntsman Corporation, The Woodlands, Tex.); Jeffamine® RFD-270 (Huntsman Corporation, The Woodlands, Tex.); polyoxypropylene diamine, commercially sold under the trademarks Jeffamine® D-400, Jeffamine® D-2000, Jeffamine® D-4000 (Huntsman Corporation, The Woodlands, Tex.); 1,5-pentanediamine, 2-methyl, commercially sold under the trademark Dytek® A (Invista, Wilmington, Del.); 1,2-diaminocyclohexane, commercially sold under the trademark Dytek® DCH-99 (Invista, Wilmington, Del.); 4,4'-methylenebis[N-sec-butylaniline], commercially sold under the trademarks Unilink™ 4200 Diamine (Dorf Ketal Chemicals India Pvt Ltd, Mumbai, India), PolyLink 4200 (The Hanson Group LLC, Duluth, Ga. and Aceto Corporation, Port Washington, N.Y.); meta-xylenediamine, commercially available from the Mitsubishi Gas Chemical Company, Inc. (New York, N.Y.); diethylmethylbenzenediamine, commercially available under the trademark Lonzacure® DETDA 80 LC (Lonza Ltd., Basel, Switzerland); diethyltoluenediamine, commercially available under the trademarks Ethacure® 100 and Ethacure® 100LC (Albemarle, Baton Rouge, La.); dimethyl thio-toluene diamine, commercially available under the trademark Ethacure® 300 (Albemarle, Baton Rouge, La.); and bis(N-sec-butyl-p-aminophenyl)methane, commercially available under the trademark Ethacure® 420 (Albemarle, Baton Rouge, La.) or mixtures thereof. In certain embodiments, one of the two difunctional amines is 4,4'-methylenebis[N-sec-butylaniline]. In certain embodiments, the amount of 4,4'-methylenebis[N-sec-butylaniline] used to form the hybrid polyurea-polyurethane header composition may range from about 1 to about 10 percent by weight of the header material.

In certain embodiments, at least one of the difunctional amines is an oligomeric diamine. Suitable examples of oligomeric diamines which may be utilized to form the hybrid polyurea-polyurethane header composition include but are not limited to a diamine curative, commercially sold under the trademark Versalink® D-740M; a polytetramethyleneoxide-di-p-aminobenzoate, commercially sold under the trademarks Versalink® P-250, Versalink® P-650, Versalink® P-1000 (Air Products and Chemicals, Inc., Allentown, Pa.); or mixtures thereof. In certain embodiments, one of the two difunctional amines is polytetramethyleneoxide-di-p-aminobenzoate. The amount of polytetramethyleneoxide-di-p-aminobenzoate used to form the hybrid polyurea-polyurethane header composition may range from about 1 to about 10 percent by weight of the header material.

Non-limiting examples of trifunctional amines which may be utilized to form the hybrid polyurea-polyurethane header composition include but are not limited to polyetheramines. Examples of polyetheramines which may be utilized to form the polyurea-polyurethane hybrid header material include but are not limited to a polyoxypropylenediamine such as glycerol tris[poly(propylene glycol)amine terminated]ether, commercially sold under the trademarks Baxxodur® EC 311 (BASF SE, Ludwigshafen, Germany) and Jeffamine® T-5000 (Huntsman Corporation, The Woodlands, Tex.); a polyoxypropylenetriamine such as that commercially sold under the trademark Jeffamine® T-403 (Huntsman Corporation, The Woodlands, Tex.); glyceryl poly(oxypropylene) triamine, commercially sold under the trademark Jeffamine® T-3000 (Huntsman Corporation, The Woodlands, Tex.); bis(hexamethylene)triamine, commercially sold under the trademark Dytek® BHMT (Invista, Wilmington, Del.); polypropylene glycol)bis(2-aminopropyl ether), commercially sold under the mark Polyetheramine D 2000 (BASF SE, Ludwigshafen, Germany) or mixtures thereof. In certain embodiments, the polyetheramine is a glycerol tris [poly(propylene glycol)amine terminated]ether. The amount of glycerol tris[poly(propylene glycol)amine terminated] ether used to form the hybrid polyurea-polyurethane header composition may range from about 1 to about 10 percent by weight of the header material.

A suitable but non-limiting example of a tetrafunctional amine which may be used to form the hybrid polyurea-polyurethane header composition is N,N'-bis(2-propyl)polyoxypropylenediamine) commercially sold under the trademark Jeffamine® SD-401 (Huntsman Corporation, The Woodlands, Tex.).

In certain embodiments, the polyurea component of the hybrid polyurea-polyurethane header composition is formed first through a multiple curing process. This multi-step curing process may be achieved through the selection of various amines. For example, the curing process may involve three steps where two difunctional amines and a trifunctional amine are utilized. First a trifunctional amine such as polyoxypropylenediamine reacts with the isocyanate. Next, an oligomeric diamine, such as polytetramethyleneoxide-di-p-aminobenzoate, reacts with the isocyanate. Third, an aromatic diamine, such as 4,4'-methylenebis[N-sec-butylaniline] reacts with the isocyanate and also functions as a chain extender. It is also possible that a lesser amount of polyol may react with an isocyanate during this multi-step curing process to form a relatively small portion of the polyurethane component in addition to the polyurea component.

In certain embodiments, the isocyanate comprises about 38.3 percent by weight of the header material, the polyol comprises about 44.8 percent by weight of the header material and the amines comprise about 12.2 percent by weight of the header material. In certain embodiments, the ratio of polyol to isocyanate is 2:1 by volume without any other components being present.

The header material formulation may comprise additional components which may include but are not limited to at least one of catalysts, pigments, defoamers, moisture scavenging molecules, moisture sensitivity reducers, adhesion promoters, viscosity depressants, UV absorbers, plasticizers, antioxidants, fungicides, UV stabilizers, and thixotropic agents.

In one embodiment, the total amount of such additives range from about 4 to about 5 weight percent; and in some embodiments, range from about 1 to about 10 weight percent, based on the total weight of the header material.

One or more catalysts which accelerate the isocyanate-polyol and/or isocyanate-amine reaction may be used within the header material, including the hybrid polyurea-polyurethane header composition, including but not limited to acids, e.g., paratoluenesulphonic acid, or tertiary amines or organo metallic compounds which have atoms such as, for example, Sn, Mn, Fe, Co, Cd, Ni, Cu, Zn, Zr, Ti, Hf, Al, Th, Ce, Bi, Hg, N, and P and mixtures thereof. The molar catalyst/isocyanate ratio is dependent on the type of isocyanate and the type of catalyst.

Suitable examples of tertiary amines which may be used within the header material, including the hybrid polyurea-polyurethane header composition, include but are not limited to triethylamine, triethylenediamine (DABCO), dimethylethanolamine, triethanolamine, N-ethyl morpholine, N-methyldicyclohexylamine, N,N-dimethyl cyclohexylamine, and N,N,N',N'-tetramethyl-1,3-butanediamine, ether and the like. Other suitable examples of tertiary amine catalysts include but are not limited to 1,8-diazabicyclo[5.4.0]undec-7-ene (a DBU catalyst), 1,5-diaza-bicyclo[5.4.0]undec-5-ene (an acid blocked DBU type catalyst), 1,8 Diaza-bicyclo(5,4,0)undecene-7, a solution of triethylenediamine and dipropylene glycol, 1,4-diazabicyclo[2.2.2]octane (crystalline), Urea, [3-(dimethylamino)propyl]-(6CI, 8CI,9CI), 2,4,6-tris(dimethylaminomethyl)phenol, Dabco® DC5LE (Air Products and Chemicals, Allentown, Pa.), an acid blocked tertiary amine such as Dabco® 8154 (Air Products and Chemicals, Allentown, Pa.), 3-(3-hydroxy-propoxy)propan-1-ol, 2-ethylhexanoic acid or mixtures thereof. In certain embodiments, 1,5-diaza-bicyclo[5.4.0]undec-5-ene and 1,8-diazabicyclo[5.4.0]undec-7-ene are utilized as catalysts. In certain embodiments, these catalysts are activated by rising temperatures below 122° F. (50° C.).

Suitable examples of organo metallic compounds which may be used within the header material, including the hybrid polyurea-polyurethane header composition include but are not limited to tin compounds such as stannous octoate, stannous chloride, dibutyltin dilaurate, dibutyltin diacetate, dibutyltin-di-2 ethyl hexoate and the like. Other suitable organo metallic compounds include bismuth octoate, zinc octoate and the like.

The amount of catalysts, if used, may, in one embodiment, be present in an amount ranging from about 0.1 to about 1 weight percent based on the total weight of the header material. In other embodiments, if a solution of triethylenediamine and dipropylene glycol is used as a catalyst, the amount may be from about 0.1 to about 5 weight percent based on the total weight of the header composition. In certain embodiments, where 1,5-diaza-bicyclo[5.4.0]undec-5-ene and 1,8-diazabicyclo[5.4.0]undec-7-ene are utilized as catalysts, the amount of 1,5-diaza-bicyclo[5.4.0]undec-5-ene which is used is 0 to about 0.5% of the total formula and the amount of 1,8-diazabicyclo[5.4.0]undec-7-ene utilized is about 0.05 to about 1% of the total formula.

In certain embodiments, two catalysts such as 1,8-diazabicyclo[5.4.0]undec-7-ene (a DBU catalyst) and 1,5-diaza-bicyclo[5.4.0]undec-5-ene (an acid blocked DBU-type catalyst) are used within the hybrid polyurea-polyurethane header composition formulation (where castor oil is used as the polyol) in order to accelerate the reaction time and extend the working time of the final mixture. The DBU catalyst causes the polyol and isocyanate to react and form the polyurethane component of the polyurea-polyurethane hybrid header material. This reaction typically takes place after the amines react to form the polyurea component of the hybrid polyurea-polyurethane header composition as described above. The DBU catalyst, when applied to the mixture, produces an exothermic reaction between the polyol and the isocyanate which accelerates the cure further and deblocks the acid blocked DBU-type catalyst, such as 1,5-diaza-bicyclo[5.4.0]undec-5-ene, which is activated by rising temperatures below 122° F. (50° C.). The de-blocked catalyst accelerates the reaction further but delays it long enough to allow for sufficient time for application of the hybrid polyurea-polyurethane header composition to the expansion joint system.

In certain embodiments, a complexing agent may be used with the catalyst to slow down the reactivity of the catalyst. For example, the catalyst 1,5-diaza-bicyclo(5.4.0)undec-5-ene uses an acid blocking system to slow down the reaction of the catalyst.

In certain embodiments, the hybrid polyurea-polyurethane header composition has a cure time or potlife before gellation of approximately 4 to 10 minutes at 75° F. (24° C.) and about 300 ml mass, with no aggregate present. In other embodiments, where low moisture content aggregate are added to about 300 ml mass of the hybrid polyurea-polyurethane header composition, the header material has a potlife before gellation of approximately 20 minutes to 3 hours at 75° F. (24° C.). In certain embodiments, the cure time before vehicles can pass over the hybrid polyurea-polyurethane header composition may range from about 30 minutes to about 14 hours.

The header composition may also comprise at least one coloring agent, such as a pigment or a dye, to provide a desired color to the formulation. The header composition may be any color and shade. Examples of colors which may be used include black, green, gray, brown and blue. In certain embodiments, the desired color is achieved by combining at least two coloring agents. The amounts of coloring agents combined may vary in any amount to obtain the desired color. Examples of coloring agents are carbon black and titanium dioxide which may be in the rutile form, but other coloring agents are also useful. Carbon black and titanium dioxide may act as both pigments and fillers in the formulation. Additional examples of pigments include, but are not limited to, barium sulfate, zinc oxide, zinc sulfide, basic lead carbonate, antimony trioxide, lithopones (zinc sulfide and barium sulfate), fluorescent dyes, oxaline dyes, inorganic color pigments such as iron oxides (e.g., iron oxide black and iron oxide brown), iron blue, carbon black, flyash, graphite, luminescent pigments, zinc yellow, zinc green, ultramarine, manganese black, antimony black, manganese violet, Paris blue, and Schweinfurter green, organic color pigments such as sepia, gamboge, Cassel brown, toluidine red, para red, Hansa yellow, indigo, azo dyes, anthraquinonoid and indigoid dyes, as well as dioxazine, quinacridone, phthalocyanine, phthalo blue, phthalo green, isoindolinone, metal complex pigments, and mixtures thereof. In certain embodiments, the hybrid polyurea-polyurethane header composition comprises carbon black as a filler/pigment. The amount of carbon black used within the hybrid polyurea-polyurethane header composition may range from 0 to about 0.6 percent by weight of the header composition.

The header composition may also include a defoamer to reduce the amount of foaming or gas bubbles produced during the polymerization reaction. Any defoamer suitable for use within solvent-free polyurea-polyurethane systems may be used. Suitable examples of defoamers which may be used in the header material, including the hybrid polyurea-polyurethane header composition include but are not limited to silicone defoamers, mineral oil/silica defoamers, low surface tension additives and mixtures thereof. Examples of silicone defoamers which may be used in the hybrid polyurea-polyurethane header composition include but are not limited to polysiloxane solutions and non-aqueous emulsions of polysiloxanes. Examples of polysiloxane solutions which may be used as a defoamer include but are not limited to a cyclohexanone polysiloxane solution, a diisobutylketone polysiloxane solution and mixtures thereof. An example of a non-aqueous polysiloxane emulsion which may be used as a defoamer is a polysiloxane propylene glycol emulsion. In certain embodiments, the defoamer is a diisobutylketone polysiloxane solution commercially available from BYK Chemie GmbH (Wesel, Germany) under the under the trademarks BYK®-066N, BYK®-070, BYK®-077, BYK®-A500. In other embodiments, the defoamer is a silicone defoamer commercially available from Cognis (Monheim, Germany) under the trademark DEHYDRAN® 1208. The amount of defoamer used within the hybrid polyurea-polyurethane header composition may range from about 0.1 to about 0.5 percent by weight of the header composition.

Moisture scavenging molecules may be added to the header composition, to ensure that the desired reaction between the isocyanate group (NCO) and the hydroxyl (OH) group takes place to form a polyurethane rather than a reaction between the isocyanate group (NCO) and water. Thus, a moisture scavenging molecule may be used to control the water level of the polyurethane prepolymer component of the header composition. Examples of moisture scavengers include but are not limited to molecular sieves which physically absorb the water, quicklime, oxazolidones, monoisocyanates such as p-toluenesulfonyl isocyanate, and ortho esters such as methyl orthoformate and triethylorthoformate and mixtures thereof. In certain embodiments, the moisture scavenging molecule which may be used in the hybrid polyurea-polyurethane header composition is a molecular sieve such as a molecular sieve zeolite capable of absorbing moisture from the system. The molecular sieve may have a size of from about 3 to about 4 angstroms to absorb water from the system. In other embodiments, the moisture scavenging molecule is a 50% solids paste in castor oil. Suitable but non-limiting examples of a moisture scavenging molecule which may be utilized in the present hybrid polyurea-polyurethane header composition includes Baylith L Paste, commercially available by Bayer Material Science, LLC (Pittsburgh, Pa.), Molsiv L paste and universal oil product (UOP) Paste, commercially available from A.B. Colby, Inc. (McMurry, Pa.) and Purmol 35T paste commercially available from Zeochem AG (Uetikon, Switzerland). The amount of moisture scavenging molecule used within the hybrid polyurea-polyurethane header composition may range from about 0.2 to about 2.5 percent by weight of the header composition.

Moisture-sensitivity reduction additives may also be included within the hybrid polyurea-polyurethane header composition in order to reduce the sensitivity to free water/moisture. Without being bound to any particular theory, it is believed that this is accomplished by reducing the amount of secondary reactions of isocyanate groups with water molecules. Suitable examples of moisture sensitivity additives include but are not limited to monomeric isocyanate oxazolidine additives such as Arnox LV and Arnox 4, commercially available by TH Hilson Company (Wheaton, Ill.); Incozol LV and Incozol 4 LV, commercially available by Incorez Corporation (Lancashire, United Kingdom); para-tosylisocyanate (PTSI), 3-ethyl-2-methyl-2-(3-methylbutyl)-1,3-oxazolidine commercially sold under the trademark Zoldine™ MS-Plus (Angus/The Dow Chemical Company, Sterlington, La.). An example of a moisture sensitivity additive which may be used in the hybrid polyurea-polyurethane header composition is Arnox LV. The amount of Arnox LV used within the hybrid polyurea-polyurethane header composition may range from about 0.2 to about 1 percent by weight of the header composition.

Adhesion promoters can also be used in the header composition to enhance the adhesive properties of the underlying structural molecules. Examples of adhesion promoters include, but are not limited to at least one of 2-aminoethyl-dimethylmethoxysilane, 6-aminohexyl-tributoxysilane, 3-aminopropyl-trimethoxysilane, 3-aminopropyl-triethoxysilane, 3-aminopropyl-methyldimethoxysilane, 3-aminopropyl-methyldiethoxysilane, 5-aminopentyl-trimethoxysilane, 5-aminopentyl-triethoxysilane, 3-aminopropyl-triisopropoxysilane, γ-glycidoxypropyltrimethoxysilane, γ-glycidoxypropyltriethoxysilane, γ-mercaptopropyltrimethoxysilane, γ-mercaptopropyltriethoxysilane, γ-ureidopropyltrimethoxysilane, γ-ureidopropyltriethoxysilane, 1-[3-(trimethoxysilyl)propyl]urea, 1-[3-(triethoxysilyl)propyl]urea, [3-(2-aminoethylamino)propyl]trimethoxysilane, [3-(2-minoethylamino)propyl]triethoxysilane, 2-(3,4-epoxycyclohexyl)ethyl-trimethoxysilane, 2-(3,4-epoxycyclohexyl)ethyl-triethoxysilane, 3-(phenylamino)propyl-trimethoxysilane, 3-(phenylamino)propyl-triethoxysilane, bis[3-(trimethoxysilyl)propyl]amine, bis[3-(triethoxysilyl)propyl]amine, 3-mercaptopropyl-methyldimethoxysilane, 3-mercaptopropyl-methyldiethoxysilane, [3-(2-aminoethylamino)propyl]methyl dimethoxysilane, [3-(2-aminoethylamino) propyl]methyl diethoxysilane, 3-glycidoxypropyl methyldimethoxysilane, 3-glycidoxypropyl-methyldiethoxysilane, 3-glycidyloxypropyltrimethoxy silane, or combinations thereof. In certain embodiments, 3-glycidyloxypropyltrimethoxysilane may be used as an adhesion promoter in the hybrid polyurea-polyurethane header composition. The amount of adhesion promoter used within the hybrid polyurea-polyurethane header composition may range from about 0.1 to about 0.8 percent by weight of the header composition.

Viscosity depressants may also be used within the header material to reduce the viscosity and improve flow during processing. These additives are also capable of improving the mixing of high viscosity polyols with low viscosity isocyanates. In certain embodiments, a defoamer may function as a viscosity depressant. Suitable examples of viscosity depressants which may be used within the polyurea-polyurethane hybrid header material formulation include but are not limited to low molecular weight glycol ethers, dimethyl AGS esters and propylene carbonate, Viscobyk® 4015 commercially available from BYK Chemie GMBH (Wesel, Germany) and Solsperse® hyperdispersants commercially available from The Lubrizol Corporation (Wickliffe, Ohio). In certain embodiments, the hybrid polyurea-polyurethane hybrid header material formulation includes a polyoxyalkylene derivative viscosity depressant. In certain embodiments, the polyoxyalkylene derivative viscosity depressant comprises from about 30 to about 60 weight percent polyoxyalkylenes, from about 30 to about 60 weight percent triethylene glycol monobutyl ether, and from about 10 to about 30 weight percent of an oligomer of alkylene glycol. A suitable but non-limiting example of a viscosity depressant which may be included within the hybrid polyurea-polyurethane header composition formulation is BYK-P 9915 commercially available by BYK Chemie GMBH (Wesel, Germany). The amount of viscosity depressant used within the hybrid polyurea-polyurethane header composition may range from about 0 to about 2.5 percent by weight of the header composition.

UV stabilizers may also be used within the header material, including the hybrid polyurea-polyurethane header composition formulation. UV stabilizers may comprise 2-(2'-hydroxyphenyl)benzotriazoles, commercially available under the trademark Ciba® Tinuvin® 328 from BASF SE (Ludwigshafen, Germany); 2-hydroxybenzophenones such as Methanone, [2-hydroxy-4-(octyloxy)phenyl]phenyl, commercially available under the trademark Ciba® Chimassorb® 81 from BASF SE (Ludwigshafen, Germany); esters of substituted and unsubstituted benzoic acids; acrylates; nickel compounds; Hindered Amine Light Stabilizers ("HALS") such as methyl 1,2,2,6,6-pentamethyl-4-piperidyl sebacate, bis(1,2,2,6,6-pentamethyl-4-piperidyl)sebacate+ methyl 1,2,2,6,6-pentamethyl-4-piperidyl sebacate, bis(2,2, 6,6-tetramethyl-4-piperidyl)sebacate, polymer of butanedioic acid dimethylester with 4-hydroxy-2,2,6,6-tetramethyl-1-piperidine ethanol, bis(1,2,2,6,6-pentamethyl-4-piperidinyl)-2-butyl-2-(4-hydroxy-3,5-di-tert-butylbenzyl)propanedioate; sterically hindered amines, oxanilides; 2-(2-hydroxyphenyl)-1,3,5-triazines; and mixtures thereof. A suitable but non-limiting example of a UV stabilizer which may be used in the polyurea-polyurethane header composition is PolyStab 100 commercially available from The Hanson Group LLC (Duluth, Ga.). In certain embodiments, UV stabilizer used within the hybrid polyurea-polyurethane header composition is methyl 1,2,2,6,6-pentamethyl-4-piperidyl sebacate. The amount of UV stabilizers used within the hybrid polyurea-polyurethane header composition may range from about 0.1 to about 2.0 percent by weight of the header composition.

In certain embodiments, the hybrid polyurea-polyurethane header composition has a compressive strength after 24 hours cure ranging from about 1400 to about 3500 psi using the 2"×2"×2" cube method according to ASTM C 579 Method B. The 24 hour and 1 week compressive strength values may vary depending on the mass of the header and the ambient temperature when the header material is applied. In certain embodiments, the hybrid polyurea-polyurethane header composition (with aggregate) has a compressive strength after 1 week cure ranging from about 2600 to about 3700 psi.

The hybrid polyurea-polyurethane header composition exhibits an excellent tensile strength. Elongation of the header material before it breaks according to ASTM D 638 must be at a minimum of 200%. The present header material exceeds this value and in certain embodiments, the hybrid polyurea-polyurethane header composition was tested at 225% elongation before break.

The hybrid polyurea-polyurethane header composition possesses sufficient impact resistance and passes the dart/cube impact test at 32° F. (0° C.), −20° F. (−29° C.) and 158° F. (70° C.) according to ASTM test formerly known as ASTM D 3029.

The hybrid polyurea-polyurethane header composition without the addition of low moisture content aggregate has an initial Brookfield viscosity ranging from about 400 to about 800 cps at 75° F. (tested on Spindle #3 at 10 rpm). The addition of low moisture content aggregate to the hybrid polyurea-polyurethane header composition increases the viscosity further.

Also provided is a method of applying a header material within an expansion joint system for an infrastructure construction. The method comprises pumping a first component of the header composition from a first storage container to a mix chamber through a first conduit and pumping a second component of the header composition from a second storage container to a mix chamber through a second conduit. The first and second components of the header composition are then mixed within the mix chamber to initiate a reaction between the first and second components to form the header composition. In certain embodiments, the first component within the first storage container includes the polyol material and the second component within second storage container includes an isocyanate material. In other embodiments, the first components within the first storage container include a polyol and an amine which when mixed with the isocyanate from the first storage container, form a polyurea-polyurethane hybrid header material. Additional components which may include but are not limited to at least one of catalysts, pigments, defoamers, moisture scavenging molecules, moisture sensitivity reducers, adhesion promoters, viscosity depressants, and UV absorbers may be added to the first storage container as first components in certain embodiments.

The mixing chamber may comprise a mechanical mixing chamber or a static mixing chamber. In certain embodiments, the mix chamber is a static mix chamber. After the components comprising the header material formulation are mixed within the mix head, the header material mixture may be applied to the recessed portions of the adjacent structural members. Methods of applying the header material mixture to the recessed portions of the adjacent structural members include allowing the material to flow from the mix head through a third conduit containing a plurality of apertures (e.g., a tube hose that contains through holes) placed within the expansion joint header or allowing the material to flow through an aperture (e.g., a nozzle) within a movable mix head.

In embodiments where a third conduit is used, such as a tube hose, the third conduit may be detachable from the mix head after application of the header material allowing the third conduit to remain within the recessed portion of the structural member after application of the header material.

In certain embodiments, the movable mix head may be moved manually or mechanically along the length of the expansion joint allowing for uniform application of the header material.

An illustrative example of an apparatus which may be used to apply a header material to an expansion joint system for an infrastructure construction is depicted in FIG. 1. The apparatus 10 comprises a first container 12 and a second container 14 for storing the two (2) liquid components of the header material. For instance, in certain embodiments, the components of the header material may be divided into two parts, namely Part A, comprising a polyol and optionally, at least one amine and Part B, comprising an isocyanate. Part A of the header material is stored in the first container 12 and Part B of the header material is stored in the second container 14. The ratio of Part A within the first storage container 12 to Part B within the second storage container 14 is about 2:1. Part A of the header material flows through a first conduit 16 from an aperture 13 in the first storage container 12 and Part B of the header material flows through a second conduit 18 from an aperture 15 in the second storage container 14. Part A of the header material flows through the first conduit 16 by gravity feed to a first pump 20 and Part B of the header material flows through the second conduit 18 by gravity feed to a second pump 22. The first pump 20 pumps the Part A header material through the first conduit 16 to manifold 24 and into a static mix head 28. Likewise, the second pump 22 pumps the Part B header material through the second conduit 18 to manifold 24 and into the static mix head 28. Electronically controlled and calibrated devices 21 and 23 continuously monitor and adjust the amount of material delivered to manifold 24 for Part A and Part B. Viscosity of Part A and Part B varies due to changes in ambient air temperature. Viscosity values generally get higher as air temperature decreases. Devices 21 and 23 provide for operation of the expansion joint header apparatus in a wide range of ambient air temperatures to ensure a proper mix ratio is achieved. Manifold 24 contains internal chambers 25 and 26 to keep Part A and Part B separated until both Part A and Part B materials depart into static mix head 28. Part A and Part B of the header material are mixed in the static mix head 28 to form the header material. The header material exits the static mix head 28 through an end nozzle 42. The expansion joint system 36 is at least partially pre-filled prior to application of the header material with a low moisture content aggregate 38 for further reinforcement.

Figure 2:
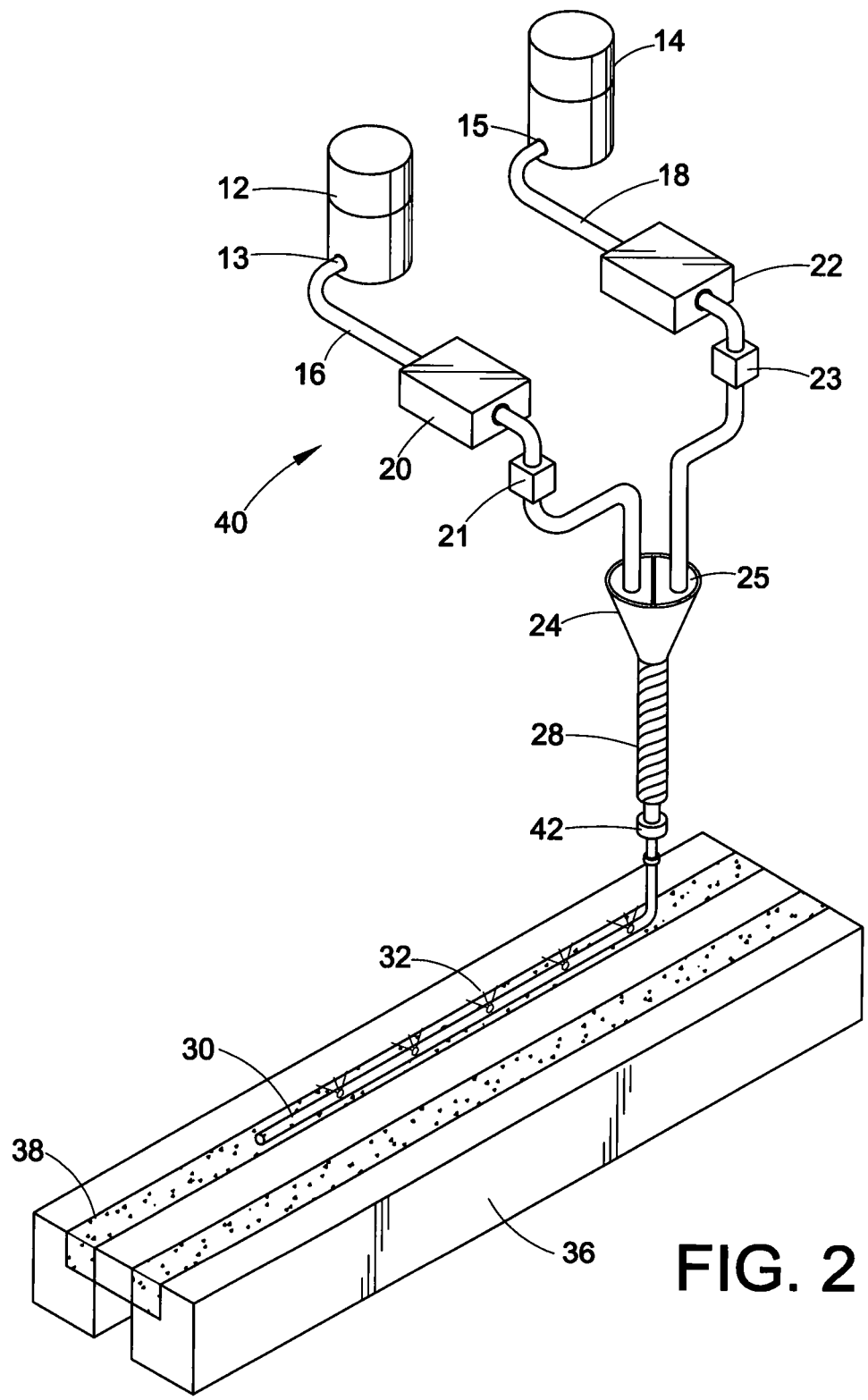
FIG. 2 is a schematic of an illustrative embodiment of a device used to apply the header material within an expansion joint for infrastructure construction.

Another illustrative example of an apparatus which may be used to apply a header material to an expansion joint system for an infrastructure construction is depicted in FIG. 2. The apparatus 40 comprises a first storage container 12 and a second storage container 14 for storing two (2) liquid components of the header material. For instance, in certain embodiments, the components of the header material may be divided into two parts, namely Part A, comprising a polyol and optionally, at least one amine and Part B, comprising an isocyanate. Part A of the header material is stored in the first storage container 12 and Part B of the header material is stored in the second container 14. The ratio of Part A within the first storage container 12 to Part B within the second storage container 14 is about 2:1. Part A of the header material flows through a first conduit 16 from an aperture 13 in the first storage container 12 and Part B of the header material flows through a second conduit 18 from an aperture 15 in the second storage container 14. Part A of the header material flows through a first conduit 16 from the first storage container 12 and Part B of the header material flows through a second conduit 18 from the second storage container 14. Part A of the header material flows through the first conduit 16 by gravity feed to a first pump 20 and Part B of the header material flows through the second conduit 18 by gravity feed to a second pump 22. The first pump 20 pumps the Part A header material through the first conduit 16 to manifold 24 and into a static mix head 28. Likewise, the second pump 22 pumps the Part B header material through the second conduit 18 to manifold 24 and into the static mix head 28. Electronically controlled and calibrated devices 21 and 23 continuously monitor and adjust the amount of material delivered to manifold 24 for Part A and Part B. Viscosity of Part A and Part B varies due to changes in ambient air temperature. Viscosity values generally get higher as air temperature decreases. Devices 21 and 23 provide for operation of the expansion joint header apparatus in a wide range of ambient air temperatures to ensure a proper mix ratio is achieved. Manifold 24 contains internal chambers 25 and 26 to keep Part A and Part B separated until both Part A and Part B materials depart into static mix head 28. Part A and Part B of the header material are mixed in the static mix head 28 to form the header material. The header material exits the static mix head 28 through a third conduit 30 having a plurality of apertures 32 (e.g., tube or hose with pre-drilled through holes). The third conduit 30 is inserted into an expansion joint header 36 having been treated with a layer of low moisture content aggregate 38. The header material flows from the static mix head 28 into the third conduit 30 by means of end nozzle 42, and exits the third conduit 30 into the expansion joint system 36 through apertures 32 found within the third conduit 30. The expansion joint header 36 is at least partially pre-filled prior to application of the header material with low moisture content aggregate 38 for further reinforcement.

Figure 3:
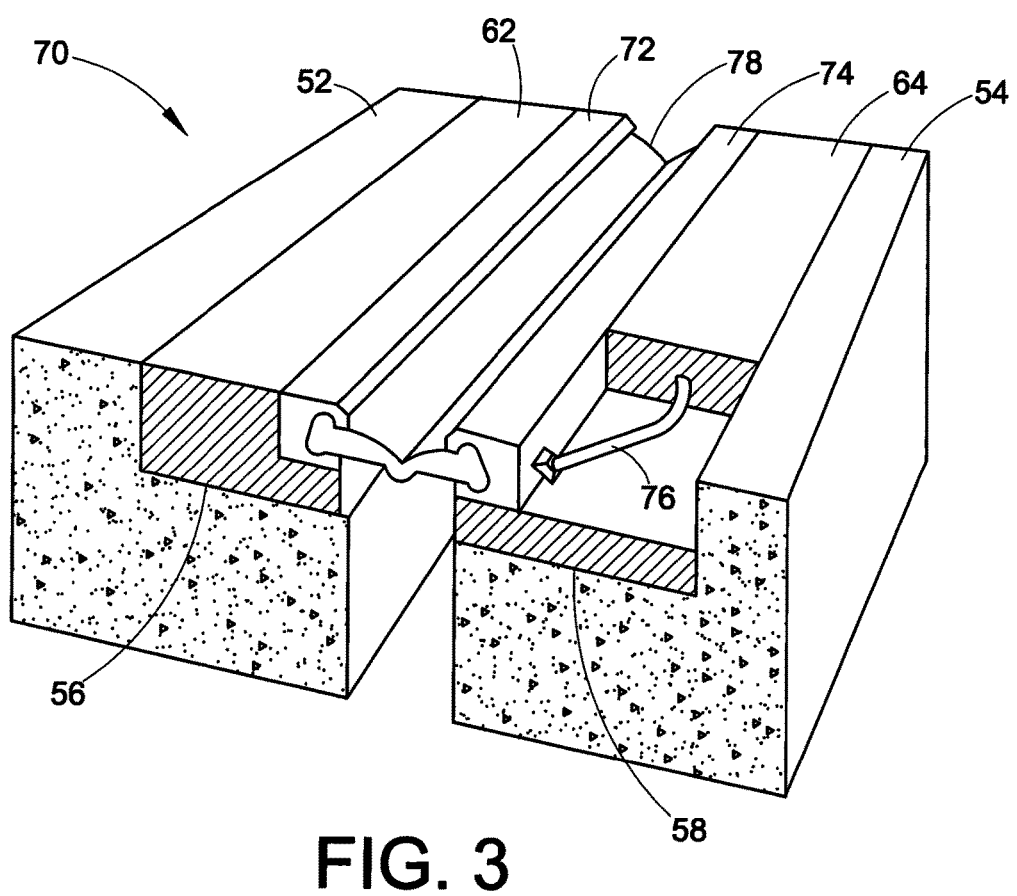
FIG. 3 is a schematic of an illustrative embodiment of an expansion joint system containing a header material.

An illustrative embodiment of an expansion joint system is shown in FIG. 3. FIG. 3 depicts an expansion joint system 70 comprising a first structural member 52 and a second structural member 54. The first and second structural members 52 and 54 contain blockouts (i.e., recessed sections) 56 and 58 respectively. An expansion joint comprised of steel shapes 72 and 74 and rubber seal material 78 is placed into the blockout area to seal the gap between the adjacent first and second structural members 52 and 54. The blockouts 56 and 58 are filled with a header material 62 and 64 to attach and make watertight the expansion joint to the structural members. The blockouts 56 and 58 are filled with a header material 62 and 64. The blockouts 56 and 58 each further contain a first channel 72 and a second channel 74 which are embedded within the header material 62 and 64 present within blockouts 56 and 58. The channels 72 and 74 are stabilized within the header material 62 and 64 by an anchor 76 (not shown for channel 72).

Figure 4:
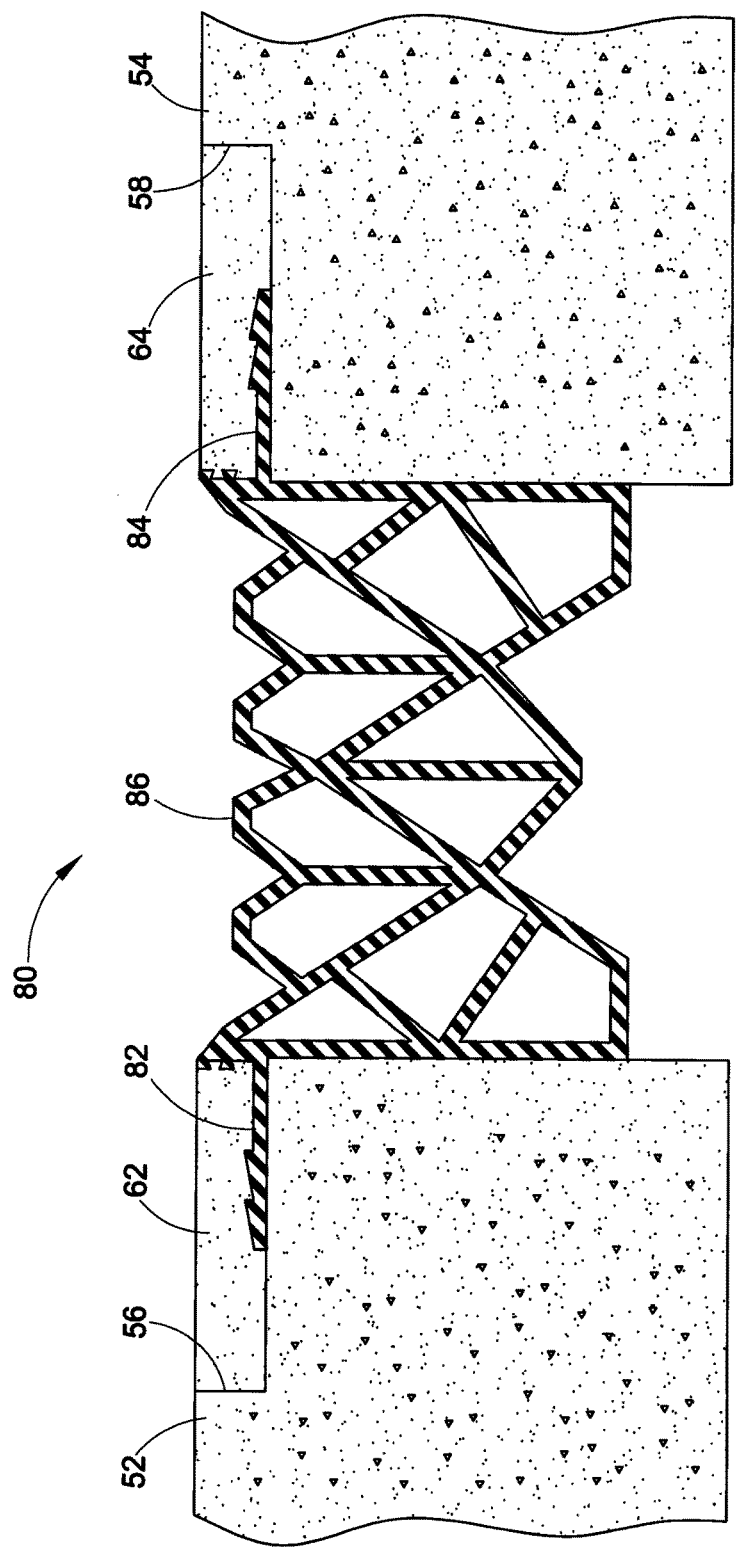
FIG. 4 is a schematic of an illustrative embodiment of an expansion joint system containing a header material.

An illustrative embodiment of an expansion joint system is shown in FIG. 4. FIG. 4 depicts an expansion joint system 80 comprising a first structural member 52 and a second structural member 54. The first and second structural members 52 and 54 contain blockouts (i.e., recessed sections) 56 and 58 respectively. The blockouts 56 and 58 are filled with a header material 62 and 64. A first flange 82 and a second flange 84 attaches a glandular seal 86 to blockouts 56 and 58 respectively.

Figure 5:
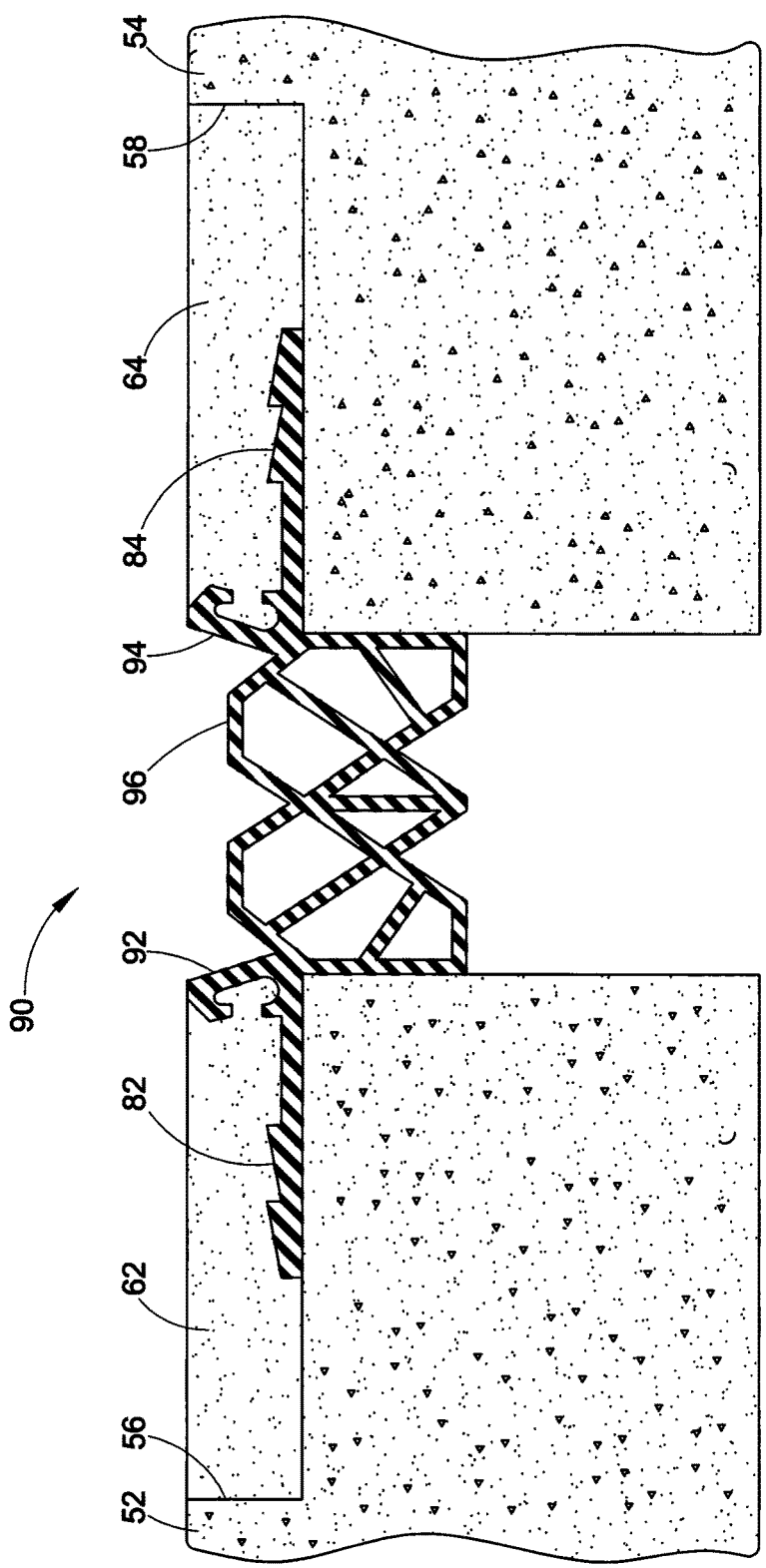
FIG. 5 is a schematic of an illustrative embodiment of an expansion joint system containing a header material.

An illustrative embodiment of an expansion joint system is shown in FIG. 5. FIG. 5 depicts an expansion joint system 90 comprising a first structural member 52 and a second structural member 54. The first and second structural members 52 and 54 contain blockouts (i.e., recessed sections) 56 and 58 respectively. The blockouts 56 and 58 are filled with a header material 62 and 64. A first flange 82, a second flange 84, a first anchor 92 and a second anchor 94 attaches a glandular seal 96 to blockouts 56 and 58 respectively.

An illustrative embodiment of an expansion joint system is shown in FIG. 6. FIG. 6 depicts an expansion joint system 100 comprising a first structural member 52 and a second structural member 54. The first and second structural members 52 and 54 contain blockouts (i.e., recessed sections) 56 and 58 respectively. The blockouts 56 and 58 are filled with a header material 62 and 64. A first flange 82 and a second flange 84 attaches a slip seal 102 to blockouts 56 and 58 respectively.

An illustrative embodiment of an expansion joint system is shown in FIG. 7. FIG. 7 depicts an expansion joint system 50 comprising to a first structural member 52 and a second structural member 54. The first and second structural members 52 and 54 contain blockouts (i.e., recessed sections) 56 and 58 respectively. The expansion joint 66 includes a backing rod 60. The blockouts 56 and 58 are filled with a header material 62 and 64 to attach and make watertight the expansion joint 66 to the structural members 52 and 54.

An illustrative embodiment of an expansion joint system is shown in FIG. 8. FIG. 8 depicts an expansion joint system 200 comprising to a first structural member 202 and a second structural member 204. The first and second structural members 202 and 204 contain blockouts (i.e., recessed sections) 206 and 208 respectively. The blockouts 206 and 208 are filled with a header material 210 and 212. A preformed expansion joint seal 214 is positioned in the gap 216 between the first structural member 202 and the second structural member 204. The preformed seal 214 includes grooves or channels 218, 220. An adhesive material 222, 224 is applied to the grooves 218, 220 in order to adhesively bond the preformed seal 214 to the cured header material 210, 212. Without limitation, the perform seal 214 may comprise a blown low density closed cell ethylene vinyl acetate polyethylene copolymer.

An illustrative embodiment of an expansion joint system is shown in FIG. 9. FIG. 9 depicts an expansion joint system 300 comprising to a first structural member 302 and a second structural member 304. The first and second structural members 302 and 304 contain blockouts (i.e., recessed sections) 306 and 308 respectively. The blockouts 306 and 308 are filled with a header material 310 and 312. A preformed expansion joint seal 314 is positioned in the gap 316 between the first structural member 302 and the second structural member 304. The preformed seal 314 is adhesively bonded to the cured header material 310, 312 with a suitable adhesive 318, 320. Without limitation, the perform seal 314 may comprise a preformed silicone strip seal which is bonded in place with a silicone sealant.

Thus, the expansion joint comprising first and second adjacent structural members having a gap defined between said structural members; a recess formed in the surfaces of said first and second adjacent structure sections; and a hybrid polyurea-polyurethane composition located within said recess of at least one of said first and second adjacent structural members.

The expansion joint of the above embodiment may further comprise a seal extending across said gap.

The expansion joint of any of the above embodiments, wherein said polyurea component of the hybrid polyurea-polyurethane blend comprises the reaction product of an amine and a polyol, and wherein the polyurethane component of the hybrid polyurea-polyurethane blend comprises the reaction product of an isocyanate and a polyol.

The expansion joint of any of the above embodiments, wherein said isocyanate comprises at least one of aromatic isocyanates, aliphatic isocyanates, and mixtures thereof.

The expansion joint of any of the above embodiments, wherein said aromatic isocyanate is selected from the group consisting of methylene diphenyl diisocyanates (MDI), toluene diisocyanates (TDI), polymeric methylene diphenyl diisocyanate (PMDI), p-phynyl diisocyanate (PDI), naphthalene diisocyanate (NDI), and mixtures thereof.

The expansion joint of any of the above embodiments, wherein said isocyanate comprises a methylene diphenyl diisocyanate.

The expansion joint of any of the above embodiments, wherein said polyol comprises a fatty acid ester.

The expansion joint of any of the above embodiments, wherein said fatty acid ester is selected from the group consisting of natural fatty acid esters, synthetic fatty acid esters and mixtures thereof.

The expansion joint of any of the above embodiments, wherein said natural fatty acid esters are selected from the group consisting of canola oil, castor oil, coconut oil, cotton seed oil, flax seed oil, hemp seed oil, jojoba oil, olive oil, palm oil, peanut oil, pumpkin seed oil, safflower oil, sesame oil, soybean oil, sunflower oil, and mixtures thereof.

The expansion joint of any of the above embodiments, wherein said natural fatty acid ester comprises castor oil.

The expansion joint of any of the above embodiments, wherein said amine comprises at least one of a monofunctional amine, a difunctional amine, a trifunctional amine, or mixtures thereof.

The expansion joint of any of the above embodiments, wherein said amine comprises two difunctional amines and a trifunctional amine.

The expansion joint of any of the above embodiments, wherein at least one of said difunctional amines comprises an aromatic amine.

The expansion joint of any of the above embodiments, wherein, wherein said aromatic amine comprises 4,4'-methylenebis[N-sec-butylaniline].

The expansion joint of any of the above embodiments, wherein at least one of said difunctional amines comprises an oligomeric diamine.

The expansion joint of any of the above embodiments, wherein said oligomeric diamine comprises polytetramethyleneoxide-di-p-aminobenzoate.

The expansion joint of any of the above embodiments, wherein said trifunctional amine comprises a polyetheramine.

The expansion joint of any of the above embodiments, wherein said polyetheramine comprises a polyoxypropylenediamine.

The expansion joint of any of the above embodiments, wherein said hybrid polyurea-polyurethane header composition further comprises at least one of a catalyst, a pigment, a defoamer, a moisture scavenging molecule, a moisture sensitivity reduction additive, an adhesion additive, a viscosity depressant, or a UV light absorption additive.

The expansion joint of any of the above embodiments, wherein catalyst comprises at least one of 1,8-diazabicyclo[5.4.0]undec-7-ene; 1,5-diaza-bicycle[5.4.0]undec-5-ene; or mixtures thereof.

The expansion joint of any of the above embodiments, wherein said defoamer comprises a diisobutylketone; the pigment comprises carbon black; the moisture scavenging molecule comprises a molecular sieve zeolite; the moisture sensitivity reduction additive comprises an oxazolidine; the adhesion additive comprises 3-glycidyloxypropyltrimethoxysilane; and the UV light absorber comprises methyl 1,2,2,6,6-pentamethyl-4-piperidyl sebacate.

The expansion joint of any of the above embodiments, wherein a defoamer functions as a viscosity depressant.

The expansion joint of any of the above embodiments, wherein the viscosity depressant comprises from about 30 to about 60 weight percent polyoxyalkylene, from about 30 to about 60 weight percent triethylene glycol monobutyl ether, and from about 10 to about 30 weight percent of an oligomer of alkylene glycol.

The expansion joint of any of the above embodiments, wherein the aggregate comprises an aggregate having a moisture content of less than 0.1%.

The expansion joint of any of the above embodiments, wherein about 50% to about 60% of the volume of the recesses are filled with the low moisture content aggregate and about 40% to about 50% of the volume of the expansion joint is filled with a header material.

The expansion joint of any of the above embodiments, wherein said hybrid polyurea-polyurethane header composition has an elongation at break of about 225%.

The expansion joint of any of the above embodiments, wherein the hybrid polyurea-polyurethane header composition has a cure time to full gellation of from about 4 to about 10 minutes at 75° F. (24° C.).

The expansion joint of any of the above embodiments, wherein the hybrid polyurea-polyurethane header composition has a cure time to full gellation of about 1 to about 3 hours at 75° F. (24° C.).

Thus, the expansion joint comprises first and second adjacent structural members having a gap defined between said structural members; a recess formed in the surfaces of said first and second adjacent structural members; and a header composition of any one of the above embodiments located within said recess of at least one of said first and second adjacent structural members, said header composition comprising a polymer composition and a low moisture content aggregate.

Thus, the method of applying a header composition in an expansion joint comprises introducing at least one isocyanate from a first storage container to a mix chamber through a first conduit, introducing at least one polyol and an amine from a second storage container to the mix chamber through a second conduit, mixing the isocyanate, the polyol and the amine in the mix chamber to form the header composition of any one of the above embodiments and applying the hybrid polyurea-polyurethane header composition into a recess formed in an expansion joint header through a movable output.

The method of the above embodiment, wherein the first component is introduced from the first storage container into the mix chamber by pumping and the second component is introduced from the second storage container into the mix chamber by pumping.

The method of any one of the above embodiments, wherein the amount of the first component and the amount of the second component pumped into the mix chamber is continuously monitored and adjusted to ensure a proper mix ratio is achieved.

The method of any one of the above embodiments, further comprising positioning a conduit having a plurality of apertures within a recess formed in the surface of at least one of adjacent first and second structural members; and applying the mixture into a recess formed in an expansion joint header.

While the present disclosure has been described in connection with various illustrative embodiments, it is to be understood that other similar embodiments may be used or modifications and additions may be made to the described embodiments for performing the same function disclosed herein without deviating there from. The embodiments described above are not necessarily in the alternative, as various embodiments may be combined to provide the desired characteristics. Therefore, the present disclosure should not be limited to any single embodiment, but rather construed in breadth and scope in accordance with the recitation of the appended claims.

We claim:

1. An expansion joint comprising:
   first and second adjacent structural members having a gap defined between said structural members, wherein said first and second adjacent structural members each comprise at least one surface;
   a recess formed in the said surfaces of said first and second adjacent structural members;
   a hybrid polyurea-polyurethane composition located within said recess of at least one of said first and second adjacent structural members, wherein said hybrid polyurea-polyurethane composition comprises the reaction product of at least one isocyanate, at least one polyol, at least one difunctional amine, and at least one trifunctional amine; and
   a seal member extending across said gap and affixed to said first and second adjacent structural members by said hybrid polyurea-polyurethane composition.

2. The expansion joint of claim 1, wherein said isocyanate comprises at least one of aromatic isocyanates, aliphatic isocyanates, and mixtures thereof.

3. The expansion joint of claim 2, wherein said aromatic isocyanate is selected from the group consisting of methylene diphenyl diisocyanates (MDI), toluene diisocyanates (TDI), polymeric methylene diphenyl diisocyanate (PMDI), p-phynyl diisocyanate (PDI), naphthalene diisocyanate (NDI), and mixtures thereof.

4. The expansion joint of claim 3, wherein said isocyanate comprises a methylene diphenyl diisocyanate and wherein said polyol comprises a fatty acid ester.

5. The expansion joint of claim 4, wherein said fatty acid ester is selected from the group consisting of natural fatty acid esters, synthetic fatty acid esters and mixtures thereof.

6. The expansion joint of claim 5, wherein said fatty acid ester is a natural fatty acid ester, wherein said natural fatty acid ester is selected from the group consisting of canola oil, castor oil, coconut oil, cotton seed oil, flax seed oil, hemp seed oil, jojoba oil, olive oil, palm oil, peanut oil, pumpkin seed oil, safflower oil, sesame oil, soybean oil, sunflower oil, and mixtures thereof.

7. The expansion joint of claim 1, wherein said reaction product comprises two difunctional amines and a trifunctional amine.

8. The expansion joint of claim 7, wherein at least one of said difunctional amines comprises an aromatic amine.

9. The expansion joint of claim 7, wherein at least one of said difunctional amines comprises an oligomeric diamine.

10. The expansion joint of claim 7, wherein said trifunctional amine comprises a polyetheramine.

11. The expansion joint of claim 1, wherein said hybrid polyurea-polyurethane composition further comprises at least one of a catalyst, a pigment, a defoamer, a moisture scavenging molecule, a moisture sensitivity reduction additive, an adhesion additive, a viscosity depressant, or a UV light absorption additive.

12. The expansion joint of claim 1, wherein an aggregate having a moisture content of less than 0.1% is blended with said polyurea-polyurethane composition.

13. The expansion joint of claim 12, wherein about 50% to about 60% of the volume of the recesses are filled with the low moisture content aggregate and about 40% to about 50% of the volume of the expansion joint is filled with a header material.

14. The expansion joint of claim 1, wherein said hybrid polyurea-polyurethane header composition is characterized by at least one of the following: (i) said header composition has an elongation at break of about 225%, (ii) said header composition has a cure time to full gellation of from about 4 to about 10 minutes at 75° F. (24° C.), and (iii) said header composition has a cure time to full gellation of about 1 to about 3 hours at 75° F. (24° C.).

15. An expansion joint comprising:
first and second adjacent structural members having a gap defined between said structural members;
a recess formed in the surfaces of said first and second adjacent structural members;
a header composition located within said recess of at least one of said first and second adjacent structural members, said header composition comprising a polymer composition and a low moisture content aggregate, wherein said header composition comprises the reaction product of at least one isocyanate, at least one polyol, at least one difunctional amine, and at least one trifunctional amine; and
a seal member extending across said gap and affixed to said first and second adjacent structural members by said header composition.

16. A method of applying a hybrid polyurea-polyurethane header composition in an expansion joint comprising:
introducing a first component of at least one isocyanate from a first storage container to a mix chamber through a first conduit;
introducing a second component of at least one polyol and an amine from a second storage container to the mix chamber through a second conduit;
mixing said first and second components to initiate a reaction between said first and second components; and
applying the mixture of said first and second components through a third conduit having a plurality of apertures, wherein the third conduit is positioned with a recess formed in the surface of at least one of first and second adjacent structural members.

17. The method of claim 16, wherein the mix chamber comprises a static mix head.

18. The method of claim 16, wherein the first component is introduced from the first storage container into the mix chamber by pumping and the second component is introduced from the second storage container into the mix chamber by pumping.

19. The method of claim 16, wherein the step of applying comprises applying the hybrid polyurea-polyurethane header composition into a recess formed in an expansion joint header through a movable output.

20. The method of claim 16, further comprising positioning a conduit having a plurality of apertures within a recess formed in the surface of at least one of adjacent first and second structural members and applying the hybrid polyurea-polyurethane header composition into a recess formed in an expansion joint header through said conduit.

* * * * *